(12) United States Patent
Hummel et al.

(10) Patent No.: US 10,846,099 B2
(45) Date of Patent: Nov. 24, 2020

(54) SELECTING A BOOT LOADER ON AN ELECTRONIC DEVICE

(71) Applicant: BlackBerry Limited, Waterloo (CA)

(72) Inventors: Bryon Hummel, Kitchener (CA); Rodney Derek Bylsma, Poway, CA (US); Catalin Visinescu, Kitchener (CA)

(73) Assignee: BlackBerry Limited, Waterloo (CA)

( * ) Notice: Subject to any disclaimer, the term of this patent is extended or adjusted under 35 U.S.C. 154(b) by 200 days.

(21) Appl. No.: 15/288,368

(22) Filed: Oct. 7, 2016

(65) Prior Publication Data

US 2018/0101388 A1   Apr. 12, 2018

(51) Int. Cl.
*G06F 9/4401*   (2018.01)
*G06F 8/65*   (2018.01)
*G06F 11/14*   (2006.01)

(52) U.S. Cl.
CPC ............... *G06F 9/441* (2013.01); *G06F 8/65* (2013.01); *G06F 11/1417* (2013.01)

(58) Field of Classification Search
CPC .................................................. G06F 9/4401
See application file for complete search history.

(56) References Cited

U.S. PATENT DOCUMENTS

| | | | | |
|---|---|---|---|---|
| 4,663,707 A * | 5/1987 | Dawson | ................... | G06F 9/24 712/E9.007 |
| 2005/0060528 A1* | 3/2005 | Kim | ................... | G06F 11/1433 713/1 |
| 2005/0114852 A1* | 5/2005 | Chen | ................... | G06F 8/65 717/168 |
| 2012/0260244 A1* | 10/2012 | Keller | ................... | G06F 8/654 717/173 |
| 2014/0304497 A1* | 10/2014 | Park | ................... | G06F 9/4406 713/2 |
| 2014/0351569 A1* | 11/2014 | Durand | ................... | G06F 8/654 713/1 |
| 2015/0046692 A1* | 2/2015 | Shin | ................... | G06F 9/4418 713/2 |
| 2015/0286823 A1* | 10/2015 | Elnekaveh | ................... | G06F 21/575 713/2 |
| 2017/0017485 A1* | 1/2017 | Ye | ................... | G06F 8/656 |

* cited by examiner

*Primary Examiner* — Kim Huynh
*Assistant Examiner* — Joshua Neveln
(74) *Attorney, Agent, or Firm* — Fish & Richardson P.C.

(57) ABSTRACT

Systems, methods, and software can be used to select a boot loader. In some aspects, a primary boot loader on an electronic device invokes a boot selector stored on a permanent memory storage on the electronic device. The boot selector selects a secondary boot loader stored on the electronic device. The selected secondary boot loader is executed to boot the electronic device.

20 Claims, 3 Drawing Sheets

SELECTING A BOOT LOADER ON AN ELECTRONIC DEVICE

TECHNICAL FIELD

The present disclosure relates to booting an electronic device.

BACKGROUND

In some cases, electronic devices, including mobile devices or other computer systems, can initiate a boot operation to boot the electronic device. The boot operation can load an operating system into the memory of the electronic device. The operating system can be launched after the boot operation is completed.

DESCRIPTION OF DRAWINGS

Like reference numbers and designations in the various drawings indicate like elements.

DETAILED DESCRIPTION

In some cases, a boot operation can also be executed by one or more boot loaders. Generally, a boot loader is a software that can be executed to perform the boot operation. In some cases, the boot operation can be performed in multiple stages. Different boot loaders can be configured to execute one or more stages of the boot operation, each boot loader invoking the next boot loader that executes a following stage of the boot operation. Therefore, the boot operation can also be referred to as a boot chain operation. In one example, the boot loader can include a primary boot loader and a secondary boot loader. The primary boot loader can be a small piece of software that is used to invoke the secondary boot loader. The secondary boot loader can include software that completes the remaining boot operation, including loading the operating system on the electronic device. In some cases, during a system upgrade, the secondary boot loader can validate a new version of the system image, load the new version of the system image onto the electronic device, and overwrite the previous version of the system image.

In general, an update system image can include an update version of the operating system of the electronic device, one or more update firmware drivers, or any other software. In some cases, the secondary boot loader can also be included in the update system image. Therefore, after the previous version of the secondary boot loader validates the update system image and loads the update system image, the previous version of the secondary boot loader would be overwritten by the secondary boot loader in the update system image.

In some cases, the secondary boot loader in the update system image may have errors or may be tampered with. In these or other cases, when the update system image is loaded, the erroneous secondary boot loader has replaced the previous version of the secondary boot loader. In these or other cases, the electronic device may not be recoverable. Because the secondary boot loader is used to load system images, once the erroneous secondary boot loader is loaded, the erroneous secondary boot loader may not be used to load a new and correct version of the system image.

Figure 1:
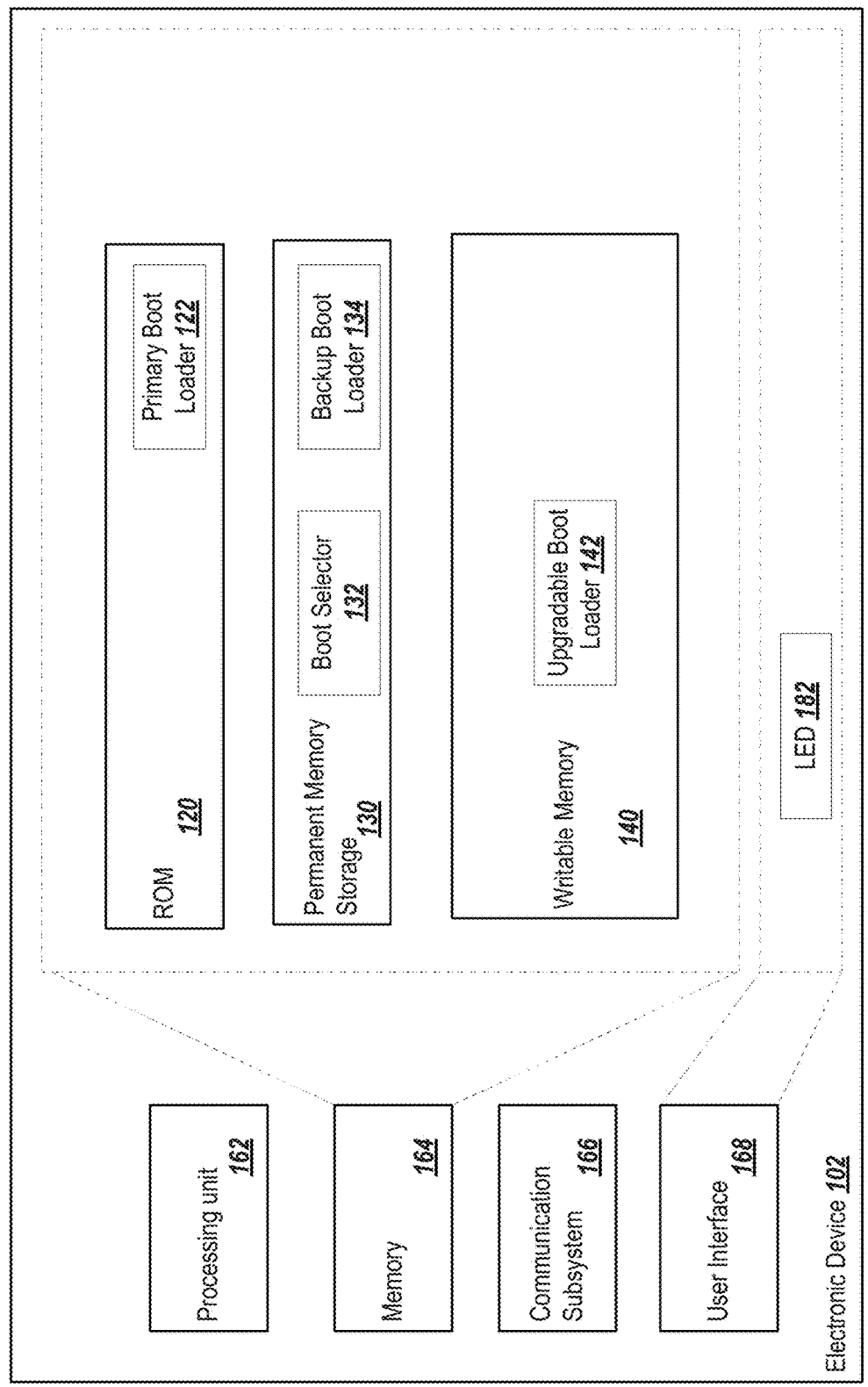
FIG. 1 is a schematic diagram showing the electronic device that executes a boot operation according to an implementation.
Figure 2:
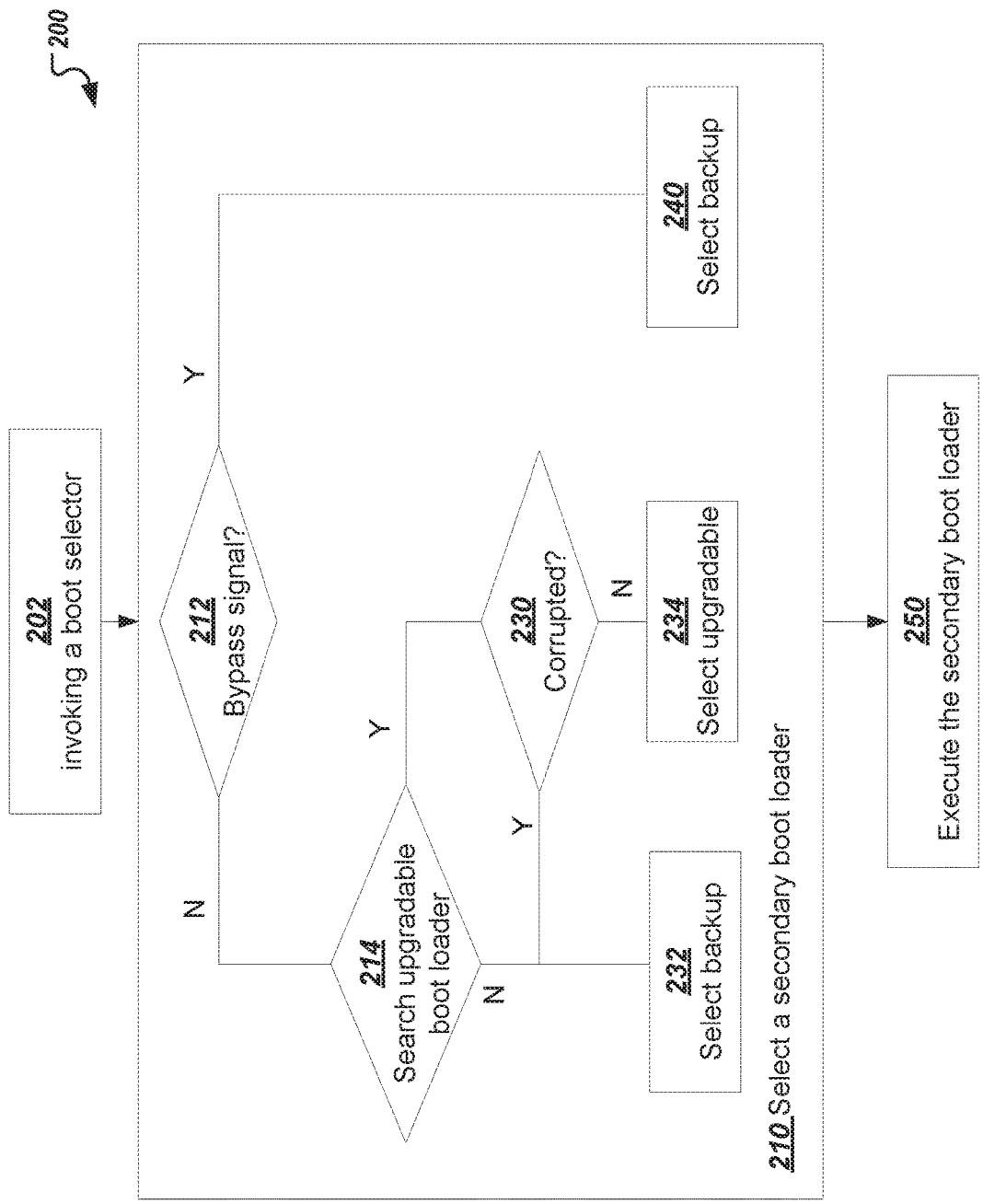
FIG. 2 is a flow diagram showing an example process for booting an electronic device according to an implementation.
Figure 3:
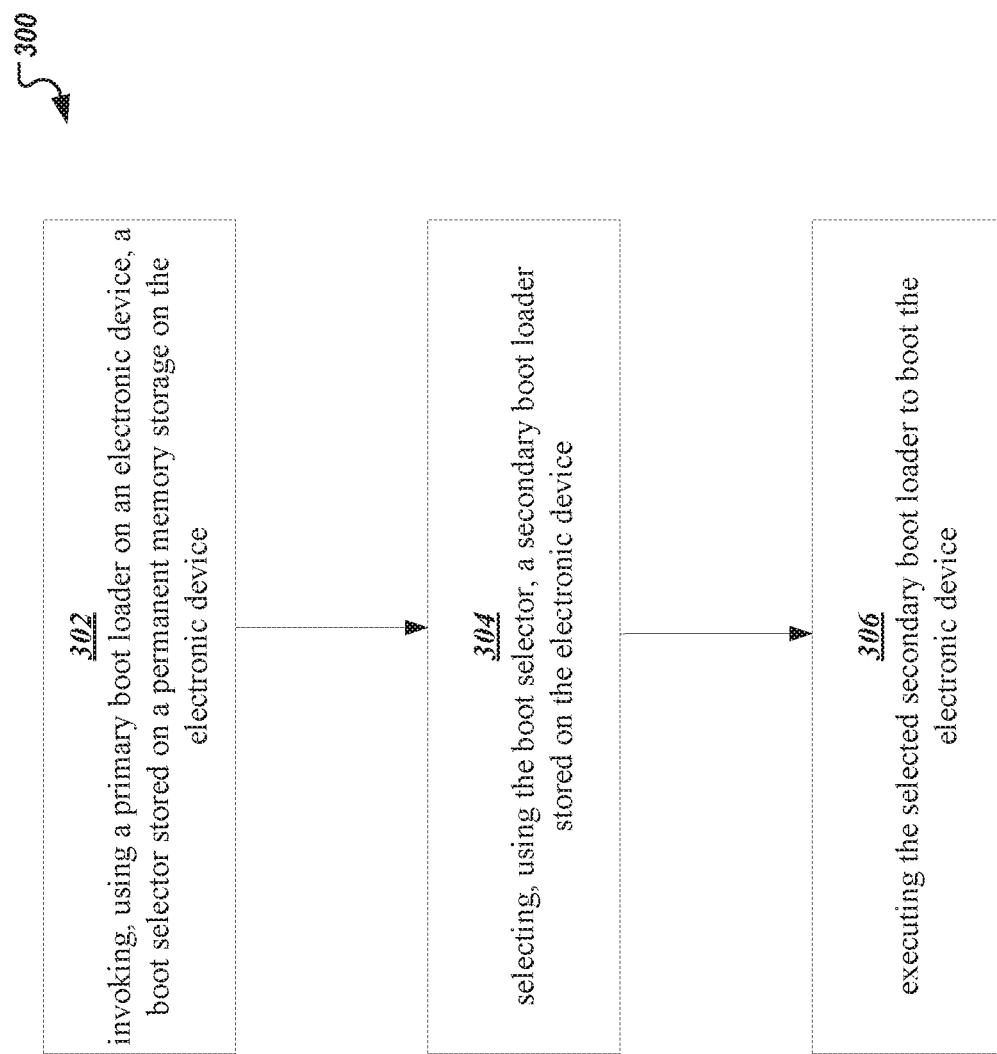
FIG. 3 is a flow diagram showing an example process for selecting a boot loader according to an implementation.

In some cases, a boot selector and a backup boot loader can be stored on a permanent storage of the electronic device. The boot selector can be configured to search and validate an upgradable boot loader in a writable memory of the electronic device. If the upgradable boot loader is found and validated, the upgradable boot loader can be selected as the secondary boot loader to complete the boot operation. If the upgradable boot loader is not found or cannot be validated, the backup boot loader can be selected as the secondary boot loader to complete the boot operation. In these cases, when a system is upgraded, a new version of the system image can include a new version of the upgradable boot loader that overwrites the previous version of the upgradable boot loader, while the backup boot loader is not modified. If the new version of the upgradable boot loader has an error, the boot selector can select the backup boot loader, which can be used to reload a different system image. FIGS. 1-3 and associated descriptions provide additional details of these implementations.

FIG. 1 is a schematic diagram 100 showing the electronic device 102 that executes a boot operation according to an implementation. The electronic device 102 includes a processing unit 162, a communication subsystem 166, a user interface 168, and memory 164. An electronic device may include additional, different, or fewer features, as appropriate.

The example processing unit 162 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 162 can be configured to generate control information, such as a measurement report, or respond to received information, such as control information from a network node. The processing unit 162 can also include other auxiliary components, such as random access memory (RAM) and read-only memory (ROM).

The example communication subsystem 166 can be configured to provide wireless or wireline communication for data or control information provided by the processing unit 162. The communication subsystem 166 can include, for example, one or more antennas, a receiver, a transmitter, a local oscillator, a mixer, and a digital signal processing (DSP) unit. In some implementations, the communication subsystem 166 can support multiple input multiple output (MIMO) transmissions. In some implementations, the receiver in the communication subsystem 166 can be an advanced receiver or a baseline receiver. Two receivers can be implemented with identical, similar, or different receiver processing algorithms.

The example user interface 168 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. As shown in FIG. 1, the example user interface 168 can include a LED 182. The LED 182 can output optical signals. In some cases, the LED 182 can output an optical signal that indicates a status of the boot operation. FIG. 2 and associated descriptions provide additional details of these implementations.

The example memory 164 can be a computer-readable storage medium on the electronic device 102. Examples of the memory 164 include volatile and non-volatile memory, magnetic media, optical media, random access memory (RAM), read-only memory (ROM), removable media, and others. The memory 164 can store an operating system (OS) of the electronic device 102 and various other computer-executable software programs for performing one or more of the processes, steps, or actions described above.

In some cases, the memory 164 can include ROM 120, permanent memory storage 130, and writable memory 140. The ROM 120 represents memory that cannot be modified after manufacture. In some cases, e.g., when the electronic device 102 is implemented using a system on chip (SoC) platform, the ROM 120 can be implemented on the same system chip that includes the processing unit 162.

The ROM 120 stores a primary boot loader 122. The primary boot loader represents a software that is executed at the first stage of a boot chain operation. Because the memory space on ROM is limited, the size of the primary boot loader is small. The primary boot loader, when executed, can invoke a boot selector 132 to continue the boot chain operation. FIG. 2 and associated descriptions provide additional details of these implementations.

The permanent memory storage 130 includes one or more memory devices that cannot be overwritten after software or data are loaded on the permanent memory storage 130 and the permanent memory storage 130 is set to be write-protected. In one example, the permanent memory storage 130 can be implemented using a write-protected embedded multimedia card (eMMC). After a software is loaded onto the eMMC, the write-protection fuse can be burned so that the software on the eMMC may not be overwritten. Alternatively or in combination, the permanent memory storage 130 can be implemented in a region of an eMMC. For example, after a software is stored on a region of the eMMC during the manufacturing process of the electronic device 102, a command can be issued to the eMMC to write-protect the region where the software is stored. Therefore, the region where the software is stored becomes a permanent memory storage and cannot be overwritten, while other regions on the eMMC can become parts of the writable memory 140. The permanent memory storage 130 can also be implemented using Universal Flash Storage (UFS), Negative-AND (NAND) flash, or like.

The permanent memory storage 130 stores the boot selector 132 and the backup boot loader 134. The boot selector 132 represents a software that is executed at the second stage of a boot chain operation. The boot selector 132, when executed, selects a secondary boot loader to continue the boot chain operation. In some cases, the boot selector 132 can search an upgradable boot loader, validate an upgradable boot loader, and select the secondary boot loader based on the results of the search and validation. Alternatively or in combination, the boot selector 132 can select the secondary boot loader based on whether a bypass signal is received. FIG. 2 and associated descriptions provide additional details of these implementations.

The backup boot loader 134 includes one or more software entities that, when executed, complete the boot chain operation. The backup boot loader 134 is stored in the permanent memory storage 130 and, therefore, cannot be overwritten after the electronic device is manufactured. FIG. 2 and associated descriptions provide additional details of these implementations.

The writable memory 140 includes one or more memory devices that can be overwritten after the electronic device is manufactured. Examples of the writable memory 140 include one or more hard disks, RAMs, removable media. Information stored on the writable memory 140 can include high level operation system (HLOS), applications, user data, and any combinations thereof.

The writable memory 140 stores an upgradable boot loader 142. The upgradable boot loader 142 includes one or more software entities that, when executed, complete the boot chain operation. In some cases, the upgradable boot loader 142 can be updated by loading a new version of the upgradable boot loader 142 onto the writable memory 140 and overwriting the previous version. In some cases, the upgradable boot loader 142 can be included in a system image. When the electronic device 102 performs a software upgrade process, a new system image is loaded onto the writable memory 140 to overwrite the previous version of the system image, including the previous version of the upgradable boot loader 142.

Turning to a general description, an electronic device, e.g., the electronic device 102, may include, without limitation, any of the following: computing device, mobile device, mobile electronic device, user device, mobile station, subscriber station, portable electronic device, mobile communications device, wireless modem, wireless terminal, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices, having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

FIG. 2 is a flow diagram showing an example process 200 for booting an electronic device according to an implementation. The process 200 can be implemented by an electronic device, e.g., the electronic device 102 shown in FIG. 1. The process 200 shown in FIG. 2 can also be implemented using additional, fewer, or different entities. Furthermore, the process 200 shown in FIG. 2 can also be implemented using additional, fewer, or different operations, which can be performed in the order shown or in a different order. In some instances, an operation or a group of the operations can be iterated or repeated, for example, for a specified number of iterations or until a terminating condition is reached.

The example process 200 begins at 202, where a primary boot loader on an electronic device invokes a boot selector. In some cases, the primary boot loader is a small piece of software executed at the first stage of a boot chain operation. In some cases, the primary boot loader is stored on a Read-Only Memory (ROM) of the electronic device. In some cases, e.g., when the electronic device is implemented using a system on chip (SoC) platform, the primary boot loader can be implemented on the ROM of the system chip that includes the central processor unit of the electronic device. Because the primary boot loader is stored on the ROM of the system chip, the primary boot loader is installed when the system chip is manufactured. Thus, the primary boot loader may not be overwritten after the system chip is manufactured.

The primary boot loader includes software codes that invoke the software to be executed at the next stage in the boot chain operation. In some cases, the boot selector is the software to be executed at the next stage in the boot chain operation. The boot selector includes software that selects a secondary boot loader to continue the boot chain operation.

In some cases, the boot selector can be stored on a permanent memory storage on the electronic device. The permanent memory storage is different than the ROM that stores the primary boot loader. As discussed previously, the permanent memory storage can be implemented using a write-protected memory device, e.g., the embedded multimedia card (eMMC), UFC, NAND flash, or like. As discussed previously, the write-protected memory device, or a region of the write-protected memory device can be configured to be a permanent memory storage after the boot selector and the backup boot loader is loaded on the write-protected memory device. Therefore, the boot selector of an electronic device may not be overwritten after the permanent memory storage is assembled into the electronic device during the manufacturing process of the electronic device.

At 210, the boot selector selects a secondary boot loader stored on the electronic device. As stated previously, the boot selector includes software that can be executed by a processor to select a secondary boot loader, to continue the boot chain operation. In some cases, the secondary boot loader can be selected based on a bypass signal. At 212, whether a bypass signal is received is determined. In some cases, the bypass signal can be generated by a user action. For example, the user can press a hardware key on the electronic device during the boot chain operation. An example of the hardware key is a volume button on the electronic device. If the user presses down the volume button, an interruption signal can be generated and sent to processor. The boot selector can determine that a bypass signal is received.

If the bypass signal is received, the process 200 proceeds from 212 to 240, where the backup boot loader is selected as the secondary boot loader. The backup boot loader is also installed on a permanent memory storage on the electronic device. In one example, the backup boot loader can be installed on the same permanent memory storage as the boot selector. The backup boot loader can include one or more software entities that can be executed to complete the boot chain operation. For example, the backup boot loader can include software that loads a system image onto the memory of the electronic device, updates a system image, launches an operating system, or performs other boot loading functions. Because the backup boot loader is stored on the permanent memory storage, the backup boot loader may not be overwritten after the electronic device is manufactured.

If there is no bypass signal received, the process 200 proceeds from 212 to 214, where the boot selector searches for an upgradable boot loader stored on a writable-memory of the electronic device. The writable memory can include one or more memory devices that can be overwritten after the electronic device is manufactured. For example, the writable memory can include one or more partitions of memory that can be accessed and written by system software, by application software, by user, or any combinations thereof. In some cases, the upgradable boot loader can be included in an updated system image that is loaded onto the memory of the electronic device during a system upgrade process of the electronic device. The upgradable boot loader can include one or more software entities that can be executed to complete the boot chain operation.

If the upgradable boot loader is not found, the process 200 proceeds from 214 to 232, where the backup boot loader is selected to be the secondary boot loader. If the upgradable boot loader is found, the process 200 proceeds from 214 to 230 where the boot selector determines whether the upgradable boot loader is corrupted.

In some cases, whether the upgradable boot loader is corrupted can be determined by verifying a signature associated with the upgradable boot loader. In some cases, the upgradable boot loader can be signed by the developer of the upgradable boot loader. The developer can generate a signature using its private key according to a cryptographic security algorithm. Examples of the cryptographic algorithms include Secure Hash Algorithm (SHA)-512, Elliptic curve cryptography (ECC) 521, other security functions or procedures, or any combinations thereof. The boot selector can validate the upgradable boot loader based on the signature using the public key of the developer. If the signature verification succeeds, then the upgradable boot loader is determined to not be corrupted. If the signature verification fails, the upgradable boot loader is determined to be corrupted.

In some cases, the boot selector can also determine a version number of the upgradable boot loader, and compare the version number of the upgradable boot loader with the current boot loader used by the electronic device. If the version number of the upgradable boot loader is less than the version number of the current boot loader, the boot selector can determine that the upgradable boot loader is corrupted. This approach can help reduce the risk of loading an older version of the boot loader that may have security issues onto the electronic device. In some cases, the version number of the current boot loader can be determined using an anti-rollback fuse. For example, when an updated boot loader is loaded on the electronic device and executes for the first time, the updated boot loader can burn one or more fuses that indicate the version number of the updated boot loader. Afterwards, the boot selector can read the fuses to determine the version number of the boot loader that has executed, and prevent older versions of the boot loader from being executed.

If the upgradable boot loader is corrupted, the process 200 proceeds from 230 to 232, where the backup boot loader is selected as the secondary boot loader. If the upgradable boot loader is not corrupted, the process 200 proceeds from 230 to 234, where the upgradable boot loader is selected as the secondary boot loader.

In some cases, a user interface output signal can be generated to indicate the status of the boot operation. Examples of the user interface output signal can include optical, audio, or any other output signals. In one example, the output signal can be an optical signal emitted by the light-emitting diode (LED) in the electronic device. Different colors, emission sequences, or any combinations thereof can be used to indicate different statuses of the boot operation. For example, the LED can emit a blue light to indicate that the bypass signal is received and the backup boot loader is executed. The LED can emit a green light to indicate that the upgradable boot loader is selected and validated. The LED can also emit a red light to indicate that the validation of the upgradable boot loader has failed. The LED can also emit different sequences using a combination of pauses and emissions to indicate a specific code corresponding to a status of the boot operation. For example, the signal combination of emission, pause, emission, emission, emission can be used to indicate an error code 103.

At 250, the selected secondary boot loader is executed to complete the boot chain operation. In some cases, the remaining procedures in the boot chain operation can include loading the operation system, firmware software, loading the installed applications, or any combinations thereof. In some cases, the secondary boot loader can validate the operation system prior to loading the operation system on the electronic device. The validation can be performed by verifying a signature of a system image.

FIG. 3 is a flow diagram showing an example process 300 for selecting a boot loader according to an implementation. The process 300 can be implemented by an electronic device, e.g., the electronic device 102 shown in FIG. 1. The process 300 shown in FIG. 3 can also be implemented using additional, fewer, or different entities. Furthermore, the process 300 shown in FIG. 3 can also be implemented using additional, fewer, or different operations, which can be performed in the order shown or in a different order. In some instances, an operation or a group of the operations can be iterated or repeated, for example, for a specified number of iterations or until a terminating condition is reached.

At 302, an electronic device invokes, using a primary boot loader on the electronic device, a boot selector stored on a permanent memory storage on the electronic device. In some cases, the primary boot loader is stored on a Read-Only-Memory (ROM) of the electronic device. The permanent memory storage is a write-protected embedded multimedia card (eMMC).

At 304, the electronic device selects, using the boot selector, a secondary boot loader stored on the electronic device. In some cases, the electronic device searches for an upgradable boot loader stored on a writable-memory of the electronic device. If the upgradable boot loader is not found, a backup boot loader stored on the permanent memory storage is selected as the secondary boot loader. If the upgradable boot loader is found, the electronic device determines whether the upgradable boot loader is corrupted. If the upgradable boot loader is corrupted, the backup boot loader is selected as the secondary boot loader. If the upgradable boot loader is not corrupted, the upgradable boot loader is selected as the secondary boot loader. In some cases, the electronic device can output an optical signal indicating a status of a boot operation.

At 306, the electronic device executes the selected secondary boot loader to boot the electronic device.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus, for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatus with or without conventional operating systems, for example LINUX, UNIX, WINDOWS, MAC OS, ANDROID, IOS, or any other suitable, conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may, instead, include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
    invoking, using a non-overwritable primary boot loader on an electronic device, a boot selector stored on a write-protected permanent memory storage on the electronic device, wherein the non-overwritable primary boot loader and the boot selector are different pieces of software that are stored on different permanent memory storage devices on the electronic device;
    selecting, using the boot selector, a secondary boot loader stored on the electronic device, wherein the secondary boot loader is selected by the boot selector between a backup boot loader and an upgradable boot loader, wherein the backup boot loader is stored on the same write-protected permanent memory storage device as the boot selector; and
    executing the selected secondary boot loader to boot the electronic device.

2. The method of claim 1, wherein selecting the secondary boot loader comprises:
    searching for the upgradable boot loader stored on a writable-memory of the electronic device; and
    if the upgradable boot loader is not found, selecting the backup boot loader stored on the permanent memory storage as the secondary boot loader.

3. The method of claim 2, wherein selecting the secondary boot loader further comprises:
    if the upgradable boot loader is found, determining whether the upgradable boot loader is corrupted;
    if the upgradable boot loader is corrupted, selecting the backup boot loader stored on the permanent memory storage as the secondary boot loader; and
    if the upgradable boot loader is not corrupted, selecting the upgradable boot loader as the secondary boot loader.

4. The method of claim 1, wherein the non-overwritable primary boot loader is stored on a Read-Only Memory (ROM) of the electronic device.

5. The method of claim 1, wherein the write-protected permanent memory storage is implemented using a write-protected embedded multimedia card (eMMC).

6. The method of claim 1, further comprising outputting an optical signal indicating a status of a boot operation.

7. The method of claim 1, wherein the secondary boot loader is selected based on a bypass signal.

8. An electronic device, comprising:
    a Read-Only Memory (ROM) that stores a non-overwritable primary boot loader;
    a write-protected permanent memory storage that stores a boot selector and a backup boot loader, wherein the non-overwritable primary boot loader and the boot selector are different pieces of software that are stored on different permanent memory storage devices on the electronic device; and
    at least one hardware processor configured to:
    invoke, by the non-overwritable primary boot loader, the boot selector;
    select, by the boot selector, a secondary boot loader stored on the electronic device, wherein the secondary boot loader is selected by the boot selector between the backup boot loader and an upgradable boot loader; and
    execute the selected secondary boot loader to boot the electronic device.

9. The electronic device of claim 8, further comprising:
    a writable-memory; and
    wherein the at least one hardware processor is further configured to:

searching for the upgradable boot loader stored the writable-memory; and if the upgradable boot loader is not found, select the backup boot loader stored on the permanent memory storage as the secondary boot loader.

10. The electronic device of claim 9, wherein the at least one hardware processor is further configured to:

if the upgradable boot loader is found, determine whether the upgradable boot loader is corrupted;

if the upgradable boot loader is corrupted, select the backup boot loader stored on the permanent memory storage as the secondary boot loader; and if the upgradable boot loader is not corrupted, select the upgradable boot loader as the secondary boot loader.

11. The electronic device of claim 8, wherein the write-protected permanent memory storage is implemented using a write-protected embedded multimedia card (eMMC).

12. The electronic device of claim 8, further comprising: an optical output signal generator configured to output an optical signal indicating a status of a boot operation.

13. The electronic device of claim 8, wherein the secondary boot loader is selected based on a bypass signal.

14. One or more non-transitory computer-readable media containing instructions which, when executed, cause an electronic device to perform operations comprising:

invoking, using a non-overwritable primary boot loader on the electronic device, a boot selector stored on a write-protected permanent memory storage on the electronic device, wherein the non-overwritable primary boot loader and the boot selector are different pieces of software that are stored on different permanent memory storage devices on the electronic device;

selecting, using the boot selector, a secondary boot loader stored on the electronic device, wherein the secondary boot loader is selected by the boot selector between a backup boot loader and an upgradable boot loader, wherein the backup boot loader is stored on the same write-protected permanent memory storage device as the boot selector; and executing the selected secondary boot loader to boot the electronic device.

15. The one or more non-transitory computer-readable media of claim 14, wherein selecting the secondary boot loader comprises:

searching for the upgradable boot loader stored on a writable-memory of the electronic device; and if the upgradable boot loader is not found, selecting the backup boot loader stored on the permanent memory storage as the secondary boot loader.

16. The one or more non-transitory computer-readable media of claim 15, wherein selecting the secondary boot loader further comprises:

if the upgradable boot loader is found, determining whether the upgradable boot loader is corrupted;

if the upgradable boot loader is corrupted, selecting the backup boot loader stored on the permanent memory storage as the secondary boot loader; and if the upgradable boot loader is not corrupted, selecting the upgradable boot loader as the secondary boot loader.

17. The one or more non-transitory computer-readable media of claim 14, wherein the non-overwritable primary boot loader is stored on a Read-Only Memory (ROM) of the electronic device.

18. The one or more non-transitory computer-readable media of claim 14, wherein the write-protected permanent memory storage is implemented using a write-protected embedded multimedia card (eMMC).

19. The one or more non-transitory computer-readable media of claim 14, the operations further comprising outputting an optical signal indicating a status of a boot operation.

20. The one or more non-transitory computer-readable media of claim 14, wherein the secondary boot loader is selected based on a bypass signal.

* * * * *